(12) United States Patent
Kadambala et al.

(10) Patent No.: US 10,511,771 B2
(45) Date of Patent: Dec. 17, 2019

(54) DYNAMIC SENSOR MODE OPTIMIZATION FOR VISIBLE LIGHT COMMUNICATION

(71) Applicant: QUALCOMM Incorporated, San Diego, CA (US)

(72) Inventors: Ravi Shankar Kadambala, Hyderabad (IN); Bapineedu Chowdary Gummadi, Hyderabad (IN); Soman Nikhara, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 15/494,241

(22) Filed: Apr. 21, 2017

(65) Prior Publication Data

US 2018/0309928 A1    Oct. 25, 2018

(51) Int. Cl.
*H04N 5/232* (2006.01)
*H04N 5/374* (2011.01)
*H04B 10/116* (2013.01)

(52) U.S. Cl.
CPC ....... *H04N 5/23245* (2013.01); *H04B 10/116* (2013.01); *H04N 5/23241* (2013.01); *H04N 5/374* (2013.01)

(58) Field of Classification Search
CPC ........... H04N 5/23245; H04N 5/23241; H04N 5/3532; H04N 5/3698; H04N 5/374; H04B 10/116
See application file for complete search history.

(56) References Cited

U.S. PATENT DOCUMENTS

| | | | |
|---|---|---|---|
| 2005/0265731 | A1 | 12/2005 | Keum et al. |
| 2014/0270796 | A1* | 9/2014 | Jovicic .............. H04B 10/1141 398/128 |
| 2014/0375982 | A1 | 12/2014 | Jovicic et al. |
| 2015/0139659 | A1* | 5/2015 | Oshima ................ H04B 10/116 398/118 |
| 2015/0280823 | A1 | 10/2015 | Breuer et al. |
| 2015/0311977 | A1 | 10/2015 | Jovicic et al. |

FOREIGN PATENT DOCUMENTS

WO    2016210305 A1    12/2016

OTHER PUBLICATIONS

Pathak, P.H., et al., "Visible Light Communication, Networking and Sensing: A Survey, Potential and Challenges", IEEE Communications Surveys and Tutorials, vol. 17, No. 4, 2015, pp. 1-35.

* cited by examiner

*Primary Examiner* — Twyler L Haskins
*Assistant Examiner* — Fayez Bhuiyan
(74) *Attorney, Agent, or Firm* — Thien T. Nguyen

(57) ABSTRACT

Disclosed herein are techniques for dynamically configuring an image sensor of a mobile device for visible light communication (VLC) to an operational mode based on the position of the image of a VLC source on the image sensor and the different regions of interest (ROIs) of different operational modes of the image sensor. The operational mode that the image sensor is configured to has the smallest ROI among ROIs of operational modes that include at least a portion of the image of the VLC source on the image sensor. Techniques disclosed herein can reduce the power consumption of the mobile device during VLC communication and improve the effective sampling rate of VLC signals by the image sensor.

30 Claims, 10 Drawing Sheets

DYNAMIC SENSOR MODE OPTIMIZATION FOR VISIBLE LIGHT COMMUNICATION

BACKGROUND

Visible Light Communication (VLC) is a method of communication by modulating the intensity of light emitted by light sources for illumination (e.g., Light Emitting Diodes (LEDs)) with data to be transmitted. In one specific application, the VLC may be performed between LEDs and a mobile device, such as a smart phone, using the camera of the mobile device to receive the modulated light from the LEDs.

BRIEF SUMMARY

Techniques disclosed herein relate to reducing the power consumption and improve data rate of a mobile device during VLC communication by dynamically configuring an image sensor of the mobile device based on the position of the image of a VLC source on the image sensor.

In accordance with an example implementation, a method of visible light communication using an image sensor of a camera on a mobile device is provided. The method may include obtaining an image of a VLC source using the image sensor that comprises a pixel array, and determining a first position of the image of the VLC source on the pixel array. The image sensor may be configurable to operate in any of a plurality of operational modes. In each operational mode of the plurality of operational modes, the image sensor may be operable to capture light signals in a different region of interest (ROI) of the pixel array, where each ROI includes a center region of the pixel array. The method may further include selecting a first operational mode from the plurality of operational modes based on the determined first position of the image of the VLC source on the pixel array and the ROIs associated with the plurality of operational modes, and configuring the image sensor to operate in the first operational mode, where the first operational mode has the smallest ROI among ROIs of the plurality of operational modes that include at least a portion of the image of the VLC source on the pixel array.

In some embodiments of the method of visible light communication, the portion of the image of the VLC source on the pixel array may include at least 50% or 100% of the image of the VLC source on the pixel array.

In some embodiments of the method of visible light communication, determining the first position of the image of the VLC source on the pixel array may include determining a minimum coordinate and a maximum coordinate of the image of the VLC source on the pixel array in each dimension of two dimensions of the pixel array. In some embodiments, selecting the first operational mode from the plurality of operational modes may include comparing the determined minimum coordinate and maximum coordinate of the image of the VLC source on the pixel array in each dimension of the two dimensions of the pixel array with the ROI associated with each operational mode of the plurality of operational modes in descending order of a size of the ROI associated with each mode, until one or more of the determined minimum and maximum coordinates of the image of the VLC source on the pixel array in the two dimensions of the pixel array are outside of the ROI associated with an operational mode of the plurality of operational modes.

In some embodiments, each of the plurality of operational modes may correspond to a different operational voltage of a control circuit of the image sensor, and configuring the image sensor to operate in the first operational mode may include applying a corresponding operational voltage to the control circuit of the image sensor. The control circuit may include an image signal processor or a driver circuit for the image sensor.

In some embodiments, the camera may include a rolling shutter. In some embodiments, obtaining the image of the VLC source using the image sensor may include reading the pixel array of the image sensor line-by-line using the rolling shutter.

In some embodiments, the method of visible light communication may further include obtaining information regarding a relative movement of the mobile device, and selecting a second operational mode from the plurality of operational modes based on the relative movement of the mobile device and at least one of the first position or the first operational mode. In some embodiments, the method may also include determining an angle of arrival of light from the VLC source to the mobile device after the relative movement of the mobile device to select the second operational mode. In some embodiments, the method may also include determining a second position of the image of the VLC source on the pixel array or a relative shift of the second position from the first position based on the relative movement of the mobile device to select the second operational mode.

In accordance with an example implementation, a camera of a mobile device may include an image sensor and an image signal processor. The image sensor may include a pixel array and may be configurable to operate in any of a plurality of operational modes, where, in each operational mode of the plurality of operational modes, the image sensor is operable to capture light signals in a different region of interest (ROI) of the pixel array, and each ROI includes a center region of the pixel array. The image signal processor may include instructions stored thereon, which, when executed by the image signal processor, may cause the image signal processor to (1) obtain an image of a VLC source using the image sensor, (2) determine a first position of the image of the VLC source on the pixel array, (3) select a first operational mode from the plurality of operational modes based on the determined first position of the image of the VLC source on the pixel array and the ROIs associated with the plurality of operational modes, and (4) configure the image sensor to operate in the first operational mode. The first operational mode may have the smallest ROI among ROIs of the plurality of operational modes that include at least a portion of the image of the VLC source on the pixel array. In some embodiments, the portion of the image of the VLC source on the pixel array may include at least 50% or 100% of the image of the VLC source on the pixel array.

In some embodiments of the camera, the first position of the image of the VLC source on the pixel array comprises a minimum coordinate and a maximum coordinate of the image of the VLC source on the pixel array in each dimension of two dimensions of the pixel array. In some embodiments, the instructions causing the image signal processor to select the first operational mode from the plurality of operational modes may include instructions for comparing the minimum coordinate and maximum coordinate of the image of the VLC source on the pixel array in each dimension of the two dimensions of the pixel array with the ROI associated with each operational mode of the plurality of operational modes in descending order of a size of the ROI associated with each mode, until one or more of the minimum and maximum coordinates of the image of the VLC source on the pixel array in the two dimensions of the pixel array are outside of the ROI associated with an operational mode of the plurality of operational modes.

In some embodiments, each of the plurality of operational modes may correspond to a different operational voltage of a driver circuit of the image sensor, and the instructions causing the image signal processor to configure the image sensor to operate in the first operational mode may include instructions for applying a corresponding operational voltage to the driver circuit of the image sensor.

In some embodiments, the camera may include a rolling shutter configured to expose one or more lines of the pixel array at a time.

In some embodiments, the instructions, when executed by the image signal processor, may further cause the image signal processor to obtain information regarding a relative movement of the mobile device, and select a second operational mode from the plurality of operational modes based on the relative movement of the mobile device and at least one of the first position or the first operational mode.

In accordance with another example implementation, an apparatus may be provided, which may include means for obtaining an image of a VLC source. The means for obtaining the image of the VLC source may include a pixel array and may be operable in any of a plurality of operational modes, where, in each operational mode of the plurality of operational modes, the means for obtaining the image of the VLC source may be operable to capture light signals in a different region of interest (ROI) of the pixel array, each ROI including a center region of the pixel array. The apparatus may also include means for determining a first position of the image of the VLC source on the pixel array, means for selecting a first operational mode from the plurality of operational modes based on the determined first position of the image of the VLC source on the pixel array and the ROIs associated with the plurality of operational modes, and means for configuring the means for obtaining the image of the VLC source to operate in the first operational mode. The first operational mode may have the smallest ROI among ROIs of the plurality of operational modes that include at least a portion of the image of the VLC source on the pixel array. In some embodiments, the portion of the image of the VLC source on the pixel array may include at least 50% or 100% of the image of the VLC source on the pixel array.

In some embodiments of the apparatus, the means for determining the first position of the image of the VLC source on the pixel array may include means for determining a minimum coordinate and a maximum coordinate of the image of the VLC source on the pixel array in each dimension of two dimensions of the pixel array. In some embodiments, the means for selecting the first operational mode may include means for comparing the determined minimum coordinate and maximum coordinate of the image of the VLC source on the pixel array in each dimension of the two dimensions of the pixel array with the ROI associated with each operational mode of the plurality of operational modes in descending order of a size of the ROI associated with each mode, until one or more of the determined minimum and maximum coordinates of the image of the VLC source on the pixel array in the two dimensions of the pixel array are outside of the ROI associated with an operational mode of the plurality of operational modes.

In some embodiments of the apparatus, each of the plurality of operational modes may correspond to a different operational voltage of a driver circuit of the means for obtaining the image of the VLC source, and the means for configuring the means for obtaining the image of the VLC source to operate in the first operational mode may comprise means for applying a corresponding operational voltage to the driver circuit of the means for obtaining the image of the VLC source.

In some embodiments, the apparatus may further include means for obtaining information regarding a relative movement of the apparatus, and means for selecting a second operational mode from the plurality of operational modes based on the relative movement of the apparatus and at least one of the first position or the first operational mode.

In accordance with yet another example implementation, a non-transitory computer-readable storage medium including machine-readable instructions stored thereon is disclosed. The non-transitory computer-readable storage medium may include instructions that, when executed by one or more processing units, cause the one or more processing units to obtaining an image of a VLC source using an image sensor. The image sensor may include a pixel array and may be operable in any of a plurality of operational modes. The image sensor may be operable to capture light signals in a different region of interest (ROI) of the pixel array in each operational mode of the plurality of operational modes, where each ROI may include a center region of the pixel array. The instructions may also cause the one or more processing units to determine a first position of the image of the VLC source on the pixel array, select a first operational mode from the plurality of operational modes based on the determined first position of the image of the VLC source on the pixel array and the ROIs associated with the plurality of operational modes, and configure the image sensor to operate in the first operational mode. The first operational mode may have the smallest ROI among ROIs of the plurality of operational modes that includes at least a portion of the image of the VLC source on the pixel array. In some embodiments, the portion of the image of the VLC source on the pixel array may include at least 50% or 100% of the image of the VLC source on the pixel array.

In some embodiments, the instructions causing the one or more processing units to determine the first position of the image of the VLC source on the pixel array may comprise instructions for determining a minimum coordinate and a maximum coordinate of the image of the VLC source on the pixel array in each dimension of two dimensions of the pixel array. In some embodiments, the instructions causing the one or more processing units to select the first operational mode may comprise instructions for comparing the determined minimum coordinate and maximum coordinate of the image of the VLC source on the pixel array in each dimension of the two dimensions of the pixel array with the ROI associated with each operational mode of the plurality of operational modes in descending order of a size of the ROI associated with each mode, until one or more of the determined minimum and maximum coordinates of the image of the VLC source on the pixel array in the two dimensions of the pixel array are outside of the ROI associated with an operational mode of the plurality of operational modes.

In some embodiments, the instructions may further cause the one or more processing units to obtain information regarding a relative movement of the image sensor, and select a second operational mode from the plurality of operational modes based on the relative movement.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

DETAILED DESCRIPTION

Figure 1:
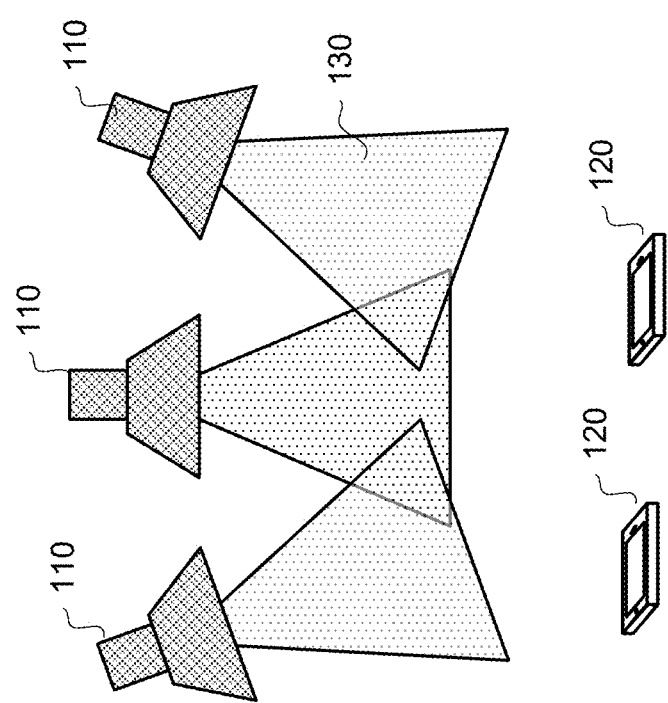
FIG. 1 illustrates an example visible light communication (VLC) system including one or more mobile devices illuminated by one or more light sources.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure.

Visible Light Communication (VLC) employing visible light sources has been developed to complement Radio Frequency (RF) technologies due to, for example, the exhaustion of RF frequency bands, crosstalk between several wireless communication technologies, and increased demand for communication security. Visible light communication using visible light, such as Light Emitting Diodes (LEDs), enables communications through widely available bandwidth without regulation. In addition, because users can visually observe the area illuminated by a VLC source as well as the direction along which the light from the VLC source travels, the coverage area of a VLC system may be accurately determined, and thus a user may use the mobile device at an optimal location for VLC communication. VLC may also offer reliable and secure communication. VLC may be used in locations where RF communication is restricted or prohibited, such as hospitals or airplanes. In some instances, VLC may also be performed using light sources other than LEDs, such as electronic display boards, TVs, traffic signs, car headlights or taillights, etc.

In one specific application, VLC may be performed between a light source (e.g., LEDs) and a mobile device (e.g., a smart phone) using a camera on the mobile device to receive modulated light signals from the LEDs. The image sensor of the camera on the mobile device may have a rolling shutter, and the image sensor may read VLC data from the VLC source line by line (i.e., row by row), and transfer the read data in frames to a processing circuit for processing.

In general, the VLC source (e.g., LEDs) would not cover the full Field of View (FoV) of the image sensor of the camera. In many cases, the VLC source may only cover, for example, less than 30%-40% of the FoV of the image sensor of the camera, depending on the physical dimensions of the VLC source and the distance between the mobile device and the VLC source. However, during VLC communication, the image sensor of the camera may, by a default setting, operate in a full-size mode in which all pixels in the full FoV of the image sensor are activated and read, regardless of the physical dimensions of the VLC source and the distance between the mobile device and the VLC source. As such, much of the data in an image frame from the image sensor may be of little or no use, and the power and resources used by the pixels to generate such data and by the processing circuit to process such data may be wasted, thus reducing the battery life of the mobile device. In addition, because more rows of pixels than needed are read in an image frame, the effective sampling rate of the VLC signals by the image sensor may be significantly lower than the row read-out rate of the image sensor.

Techniques disclosed herein can reduce the power consumption of the mobile device during VLC communication and improve the effective sampling rate of the VLC signal by the image sensor. More specifically, the image sensor of the camera on the mobile device for VLC communication may be dynamically reconfigured to different operational modes that use different numbers of pixels, based on the position of the image of the VLC source on the image sensor.

I. Visible Light Communication System

A VLC system generally includes one or more VLC base stations and one or more VLC terminals. A VLC base station may include one or more light sources, such as an LED or a Laser Diode (LD), for illumination purposes and for transmitting data using visible light. The VLC base station may transmit data to and receive data from a VLC terminal. The VLC base station may receive data from the VLC terminal using an optical or RF signal detector. The VLC base station may also include a controller that can process data to be transmitted by the light source and process data received from a VLC terminal. A VLC terminal may include a visible light transmission/reception module for transmitting data to and receiving data from the VLC base station through the light source of the VLC base station. The VLC terminal may be a mobile device, such as a cellular phone, a Personal Digital Assistant (PDA), a tablet device, etc. The VLC terminal may also transmit data to and receive data from another VLC terminal using visible light. VLC may also be used in combination with other wired/wireless communication technologies, such as RF communication technologies, in a communication system.

As high-power white LEDs rapidly replace fluorescents as the lighting sources of choice, due to the relatively high energy efficiency, low total cost of ownership, and low environmental impact of the LEDs, it has been possible to effectively modulate the high-power light emitted by lighting fixtures and bulbs used for general illumination. In order for LED lighting to be used as a VLC source, the modulation associated with VLC must not compromise the primary function of illumination. The design considerations for VLC sources include impacts on human vision, support for a broad range of dimming levels, energy efficiency, and compatibility with the existing hardware in the lighting fixture.

Unlike linear and compact fluorescents, LEDs can be modulated at relatively high frequencies because they are semiconductor devices. Using modulation frequencies in the kHz range or above can ensure that the modulated light signals (i.e., VLC signals) will not cause any light flicker that could be perceived by the human eye, while at the same time allowing for sufficiently high data rates for supporting data communications. The light output from the LEDs may be modulated using binary modulation, which may preserve the energy efficiency of the lighting fixtures. The binary modulation can be achieved using, for example, highly efficient boost converters that are an integral component of Pulse-Width-Modulation (PWM)-dimmable LED drivers. Thus, the modulation is not only efficient and compatible with existing driver hardware, but also naturally conforms to the standard methods of dimming based on PWM and variation of the maximum current. As such, the lighting fixtures can fulfill their primary function of providing energy-efficient illumination while simultaneously acting as communication transmitters.

In some applications, VLC techniques can also be used for mobile device positioning, and in particular, indoor positioning where other positioning techniques (e.g., GPS) may not work or may not be reliable. For example, the VLC signal transmitted by each lighting fixture may include a unique identifier which differentiates one lighting fixture from other lighting fixtures. The identifier may either be stored internally in the driver or supplied from an external system, such as a Bluetooth wireless mesh network. In some cases, a lighting fixture may periodically change its identifier to prevent unauthorized use of the lighting fixture and for security reasons. The locations of the lighting fixtures and their identifiers may be stored on a server and/or added to a map. A mobile device may download or otherwise receive the stored locations of the lighting fixtures and their identifiers (or the map) from the server, and determine its own position based on the fixture identifier received in a VLC signal from a VLC source and the lighting fixture information (e.g., location information of the lighting fixture) received from the server.

The VLC terminal, such as a mobile device, may use a Complementary Metal-Oxide-Semiconductor (CMOS) image sensor that can be configured to extract time domain VLC signals from a sequence of image frames that capture a given lighting fixture. The time domain VLC signals may be demodulated and decoded by the mobile device to reproduce the transmitted data including the unique fixture identifier of the lighting fixture. An image sensor may capture images containing multiple lighting fixtures in the field of view of the sensor in parallel, and extract VLC signals from the multiple lighting fixtures. This allows the mobile device to use the locations of multiple lighting fixtures to more reliably determine its position.

From the lighting fixture identifiers and the locations of the lighting fixtures, the mobile device may only determine its approximate position, such as within a few meters of its actual location. More measurements and processing must be performed using the captured images to more precisely determine the mobile device's actual position, such as within a few centimeters. An image sensor may include millions of pixels, where, when capturing an image frame at any given time instant, each pixel may only receive light energy coming from a very narrow range of physical directions. By performing pixel-level analysis, the mobile device can precisely determine the direction of arrival of light from one or more lighting fixture, and therefore can calculate its position relative to the one or more lighting fixtures with an accuracy of within a few centimeters using, for example, triangulation or trilateration techniques. Using information about the locations of the lighting fixtures determined based on the fixture identifiers in the VLC signals and the relative position between the lighting fixtures and the mobile device, the absolute geographic position of the mobile device can be determined with a centimeter-level accuracy.

FIG. 1 illustrates an example visible light communication system including one or more mobile devices 120 illuminated by light beams 130 from one or more light sources 110. Light sources 110 can be any lighting source used for general purpose, spot illumination, or backlighting, such as LEDs or Organic LEDs (OLEDs). Light sources 110 can be in various form factors, including, but is not limited to, Edison screw in, tube style, large and small object backlighting, or accent lighting spots and strips.

Light beams 130 may be modulated LED light beams in the visible electromagnetic spectrum, such as from about 375 nm to about 780 nm. LEDs can be rapidly switched on and off to send signals above the rate which the human eye can see, using various binary modulation schemes, such as Frequency Shift Keying (FSK) and On-Off Keying (OOK), which is a form of Amplitude-Shift Keying (ASK) that represents digital data through either the presence or absence of a carrier wave. Other modulation schemes for VLC communications using LEDs may include, for example, Digital Pulse Recognition (DPR), Variable Pulse Position Modulation (VPPM), Color Shift Keying (CSK), Multiple Pulse Position Modulation (MPPM), Pulse Dual Slope Modulation (PDSM), and Inversed Pulse Position Modulation (IPPM) modulation schemes. By modulating the LEDs with digital information to be transmitted at, for example, about 10 kbps to about 500 Mbps, light beams 130 may carry digital information that is unperceivable by the human eye, but is perceivable by appropriate sensors, including, but not limited to, image sensors and other types of photosensors or photodetectors.

Mobile device 120 may be a mobile device, such as a mobile phone, a tablet, or a portable laptop computer. Mobile device 120 may have an embedded or attached sensor which is used to receive the incoming light beam 130. One such sensor is a camera. A particular camera may have a frame refresh rate between about fifteen (15) and about sixty (60) frames per second (fps), just as an example. The frame refresh rate may be directly related to the speed at which optical signals can be transmitted by the VLC source and received by the camera. Mobile device 120 may use a CMOS image sensor that utilizes a rolling shutter mechanism. Due to their superior energy efficiency, CMOS sensors are generally preferred on mobile devices over Charge-Coupled Device (CCD) sensors. When a CMOS image sensor with a rolling shutter takes an image, it does not expose an entire image frame simultaneously. Instead, the rolling shutter partially exposes different portions of the image frame at different points in time.

Mobile device 120 can include various functional modules implemented in different combinations of hardware (e.g., processing circuits, memory, and sensors) and firmware/software for capturing and analyzing light beams 130 from light sources 110. At least some portions of the functional modules may be stored in memory and can be run by a processing circuit to process the captured images and analyze the images to determine information encoded in light beams 130. Some functional modules may be an application that runs on the mobile device when selected by a user. Some functional modules can be built into the mobile device to provide the capabilities or can be downloaded and installed as appropriate.

II. Mobile Device for VLC

Figure 2:
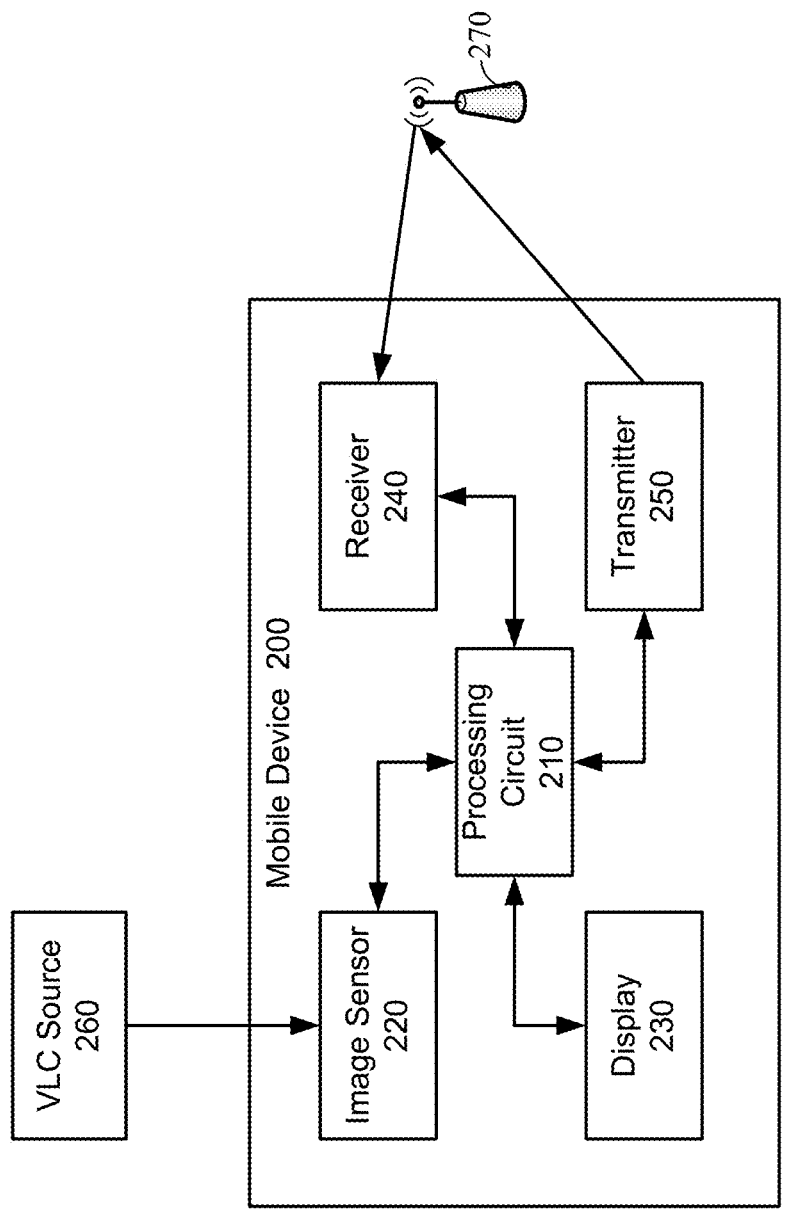
FIG. 2 illustrates an example mobile device capable of visible light communication, according to certain aspects of the present disclosure.

FIG. 2 illustrates an example mobile device 200 capable of visible light communication, according to certain aspects of the present disclosure. Mobile device 200 may include a processing circuit 210, an image sensor 220, a display 230, a receiver 240, and a transmitter 250. As described above, image sensor 220 may be used for taking videos or pictures and for VLC communication. Receiver 240 and transmitter 250 may be used for communication using other air interface technologies, such as WiFi, WiMax, or cellular communication technologies (e.g., Global System for Mobile Communication (GSM), Code Division Multiple Access (CDMA), Frequency Division Multiple Access (FDMA), Orthogonal Frequency Division Multiple Access (OFDMA), Long-Term Evolution (LTE), LTE Advanced, and Wideband CDMA (W-CDMA)). In some cases, image sensor 220 may be used in combination with receiver 240 and transmitter 250 for data communication.

Processing circuit 210 may include one or more processors (e.g., ARM® or MIPS® processor), microcontrollers, Graphic Processing Units (GPUs), or Application Specific Integrated Circuits (ASICs). Processing circuit 210 may determine that a VLC receive mode for capturing VLC image frames is triggered based on various techniques, including a user input to mobile device 200, a physical orientation of mobile device 200, a signal received via receiver 240 indicating the presence of at least one VLC source, and the like.

When the VLC receive mode is trigged, processing circuit 210 may instruct image sensor 220 to operate at a default setting. The default setting may include the exposure setting, resolution, and number of pixels used for capturing a photographic image. Image sensor 220 may be a CMOS image sensor as described above. The setting of image sensor 220 may be adjusted by processing circuit 210. Image sensor 220 may capture one or more photographic images of a VLC source 260 until a maximum frame count is reached or until processing circuit 210 transmits an instruction to image sensor 220 to terminate the image frame capturing.

Processing circuit 210 may detect a presence of at least one communication symbol included in the one or more VLC signal frames captured by image sensor 220 and decodes a message associated with the one or more VLC image frames by decoding a number of detected communication symbols. Processing circuit 210 may indicate to image sensor 220 completion of message decoding when all communication symbols required for decoding the message are detected and decoded.

In some implementations, processing circuit 210 may also activate display 230 to display information related to the one or more VLC image frames or the decoded message corresponding to the one or more VLC image frames. Processing circuit 210 may also activate transmitter 250 to transmit information related to the one or more VLC image frames or decoded message (e.g., VLC source location or related content) to a remote server 270. Processing circuit 210 may also receive from remote server 270 (via the receiver 240) information in response to the transmitted information related to the one or more VLC image frames or decoded message from mobile device 200.

III. Image Sensor

As described above, an image sensor, such as a CMOS image sensor, can be used to receive VLC signals from VLC sources. A CMOS image sensor is an integrated circuit for electronically capturing images using Active Pixel Sensor (APS) technology, therefore acting as an "electronic film." Unlike CCD image sensors that have been used in the past to capture electronic images, the CMOS sensors are produced using mainstream microelectronic fabrication processes. Advantages of the CMOS APS technology include low cost, small size, and the ability to integrate a significant amount of Very-Large-Scale-Integrated (VLSI) electronics on-chip. A rolling electronic shutter may be used on a CMOS image sensor, where one row of the image sensor can be selected and read at a time and the pixels of the image sensor can be selected and read row by row to generate an image frame. As used herein, "row" may be used interchangeably with "line."

In a CMOS APS device, each pixel of the image sensor array may have both a photodetector and an active transistor circuitry for reading the output signal from the photodetector on the pixel. The photodetector for each pixel in the image sensor array may convert photons incident on the pixel to an electric charge via the photoelectric effect. The charge may be integrated over a period of time that is long enough to collect a detectable amount of charge, but short enough to avoid saturating the storage elements. This period of time for the charge integration is analogous to a film exposure time (i.e., the shutter speed) and may also be referred to as an integration time. In the image sensor array of the CMOS APS device, the integration time may be the time between a reset of a given row and a subsequent read of the row. The integration time can be adjusted based on an image exposure analysis using, for example, an average intensity scheme or image histogram measurements. Since only one row is selected at a time using the rolling electronic shutter, the reset/read routine may be sequential (i.e. row by row). The shutter width may be the time between the integration is enabled and the integrated charges are readout. The shutter width can be adjusted to control the gain of an exposed area of the image sensor array.

Figure 3B:
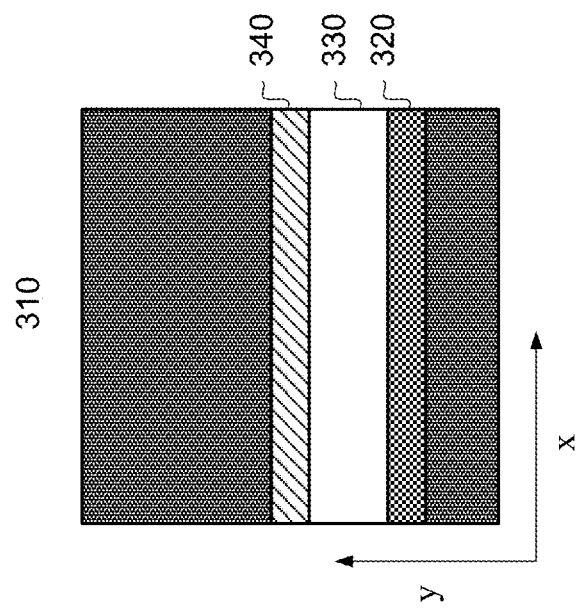
FIG. 3B illustrates the status of different rows of pixels in an image sensor at a second time.
Figure 3A:
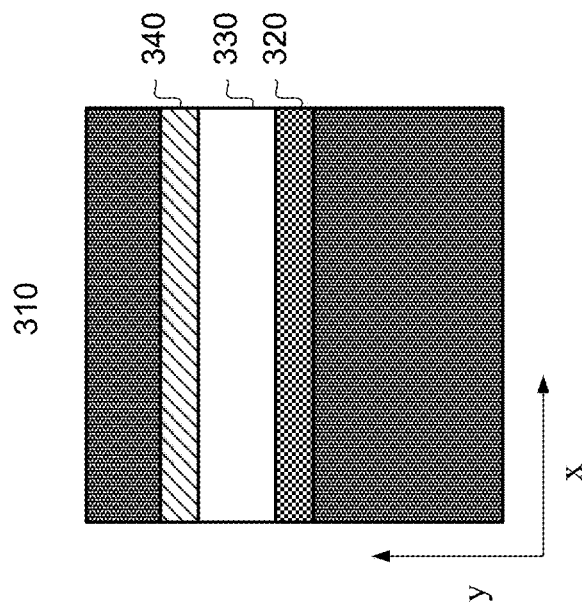
FIG. 3A illustrates the status of different rows of pixels in an image sensor at a first time.

FIGS. 3A and 3B illustrate example exposure control using an electronic rolling shutter in an image sensor 310. As described above, a CMOS image sensor in a mobile device (e.g., a smartphone or a tablet) generally employs an electronic shutter to read/capture an image frame one row at a time. FIG. 3A illustrates the status of different rows of pixels in image sensor 310 at a first time. At the first time, pixels on row 320 of image sensor 310 may be reset, pixels on row(s) 330 may be exposed to VLC light signals, and pixels on row 340 may be read out and transferred to a temporary buffer before the pixels from all rows are read to generate an image frame. Pixels in row(s) 330 may be exposed to the VLC light signals to accumulate charges on each pixel. The rest of the pixels in image sensor 310 may be deactivated and may not consume any electrical energy at the first time. The windows that include the row (320) of pixels being reset, the row(s) (330) of pixels being exposed to VLC light signals, and the row (340) of pixels being read may be shifted down one row at a time to generate the image frame, as shown in FIG. 3B, which illustrates the status of different rows of pixels in image sensor 310 at a subsequent second time.

Figure 4:
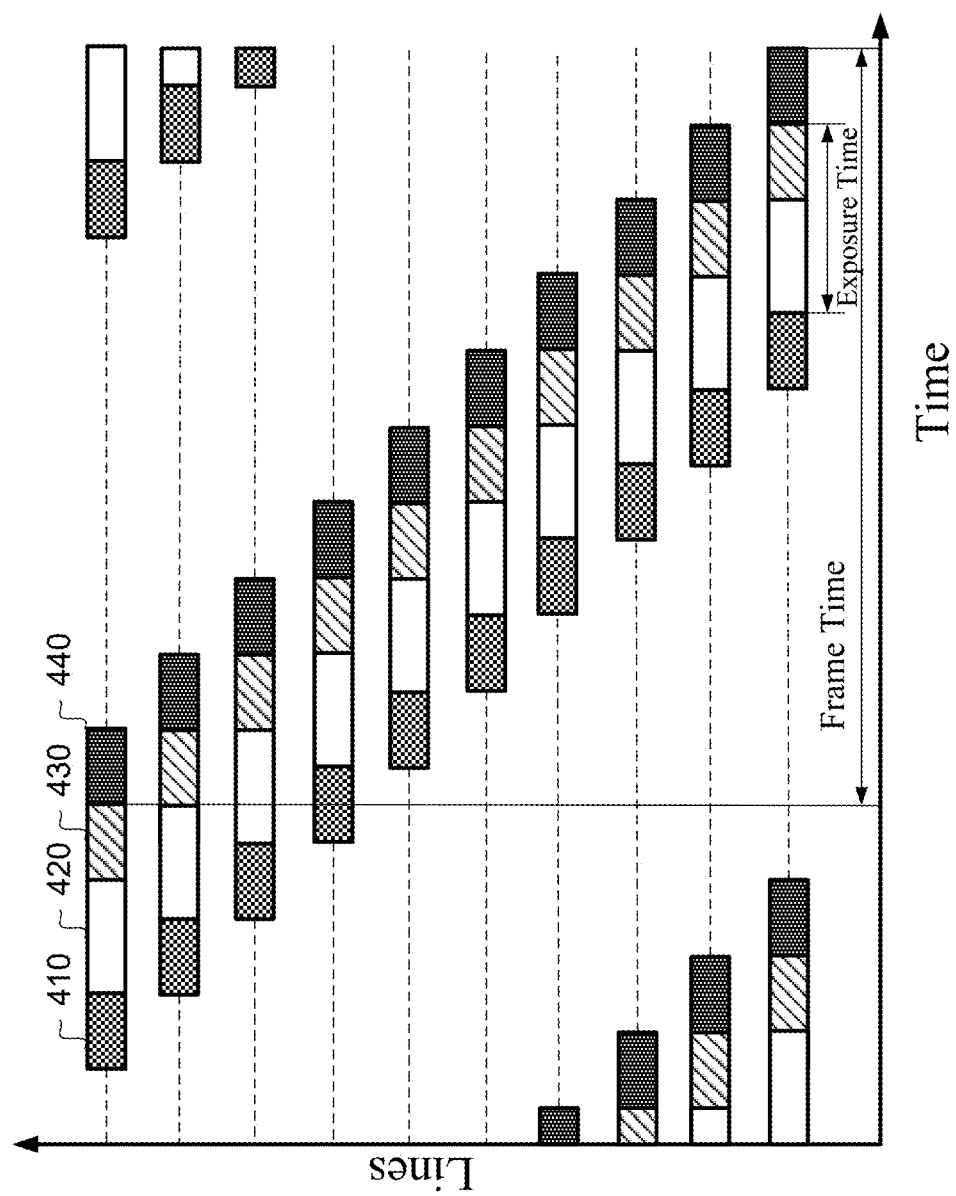
FIG. 4 illustrates an example operation of line-by-line reading from an image sensor using a rolling shutter.

FIG. 4 illustrates an example operation of line-by-line reading from an image sensor using a rolling shutter. As The time it takes to acquire VLC signals from pixels in each row may include a reset period 410, an exposure period 420, a readout period 430, and a data transfer period 440. VLC signals may be acquired by all rows of pixels in the image sensor in a pipeline, and thus the time it takes to generate an image frame may be the sum of data transfer period 440 or readout period 430 for each row, as shown in FIG. 4. Because each row is acquired at a different time and therefore the readout signal from each row represents the VLC signal transmitted at a different time, the line (row) sampling rate is effectively the data sampling rate for the VLC signal. For example, if the line sampling rate of the image sensor is 40 KHz (which is the case for a 2 Megapixel camera running at 30 frames per second), readout period 430 or data transfer period 440 for each row is about 25 µs, and the VLC signal is effectively sampled at 40 ksps.

FIG. 4 also shows the exposure time for each row of pixels. The exposure time may be controlled by adjusting the number of rows (e.g., 330) between the row (e.g., 340) on which the read operation is performed and the row (e.g., 320) on which the read reset operation is conducted. The pixels in rows 330 are simultaneously exposed to VLC light signals. The time duration between the read and reset operations may be referred to as a shutter time. The shutter time may be expressed in terms of time units (e.g., fractions of a second) or a number of rows that are simultaneously exposed to light. CMOS image sensors are designed for photography, hence the exposure is normally controlled by an Automatic Exposure Control (AEC) technique which attempts to adjust exposure levels to ensure that the captured image is bright enough for human perception. Typically, a darker scene requires a longer exposure time for each row of the sensor array. Since a read-out rate of the rows may be constant over time, an increased exposure time may be achieved by exposing multiple rows at the same time. The number of rows exposed at any given time may be an integer number N. A N-row exposure setting may reduce the effective sampling rates or the signal to noise ratio of the captured VLC signals because the data read out from each row is effectively an average value of the transmitted VLC signal during the exposure time, which may be equal to N readout periods 430 or N data transfer periods 440. Thus, in an aspect, the number (N) of image sensor rows that are exposed at any given time should be as small as possible to ensure that high frequency VLC signals are not attenuated by the averaging or filtering effect of the N-row exposure setting.

The CMOS image sensor of a camera may generally have the flexibility to configure its pixel array by a control circuit (e.g., an image signal processor and/or a sensor driver circuit) to activate different numbers of pixels in different operational modes. For example, preview/snapshot may be taken by the image sensor in a full-size mode with all pixels of the image sensor activated and used, while 4 k×2 k, 1080P, 720P, VGA, or other types of videos or images may be taken in operational modes with a smaller number of pixels activated and used. Thus, it may be possible to dynamically select different operational modes of the image sensor during the VLC communication such that a minimum number of pixels may be used to detect the light signals from the VLC source.

The driver circuit of the image sensor of the camera on a mobile device may be designed to support different Image Signal Processor (ISP) clock rates, which may correspond to different operational voltage levels of the ISP (and/or the driver circuit of the sensor) set by a power management circuit. In some implementations, the ISP, when being set to a voltage level, may instruct the sensor diver circuit to operate the image sensor in a corresponding mode. In some implementations, the operational voltage levels of the ISP may include levels such as static voltage scaling (sys), nominal (nom), and turbo (overdrive) levels. For example, for an ISP with a nominal voltage level of 1.2 V, the sys voltage level may be 1.1 V or lower, while the turbo voltage level may be 1.3 V or higher. The different voltage levels may correspond to different ISP clock rates. For example, the clock rate for the turbo voltage level may be 800 MHz or higher, while the clock rate for the sys voltage level may be 200 MHz or lower. The different ISP clock rates or voltage levels set by the power management circuit may also correspond to different operational modes of the image sensor of the camera.

Figure 5:
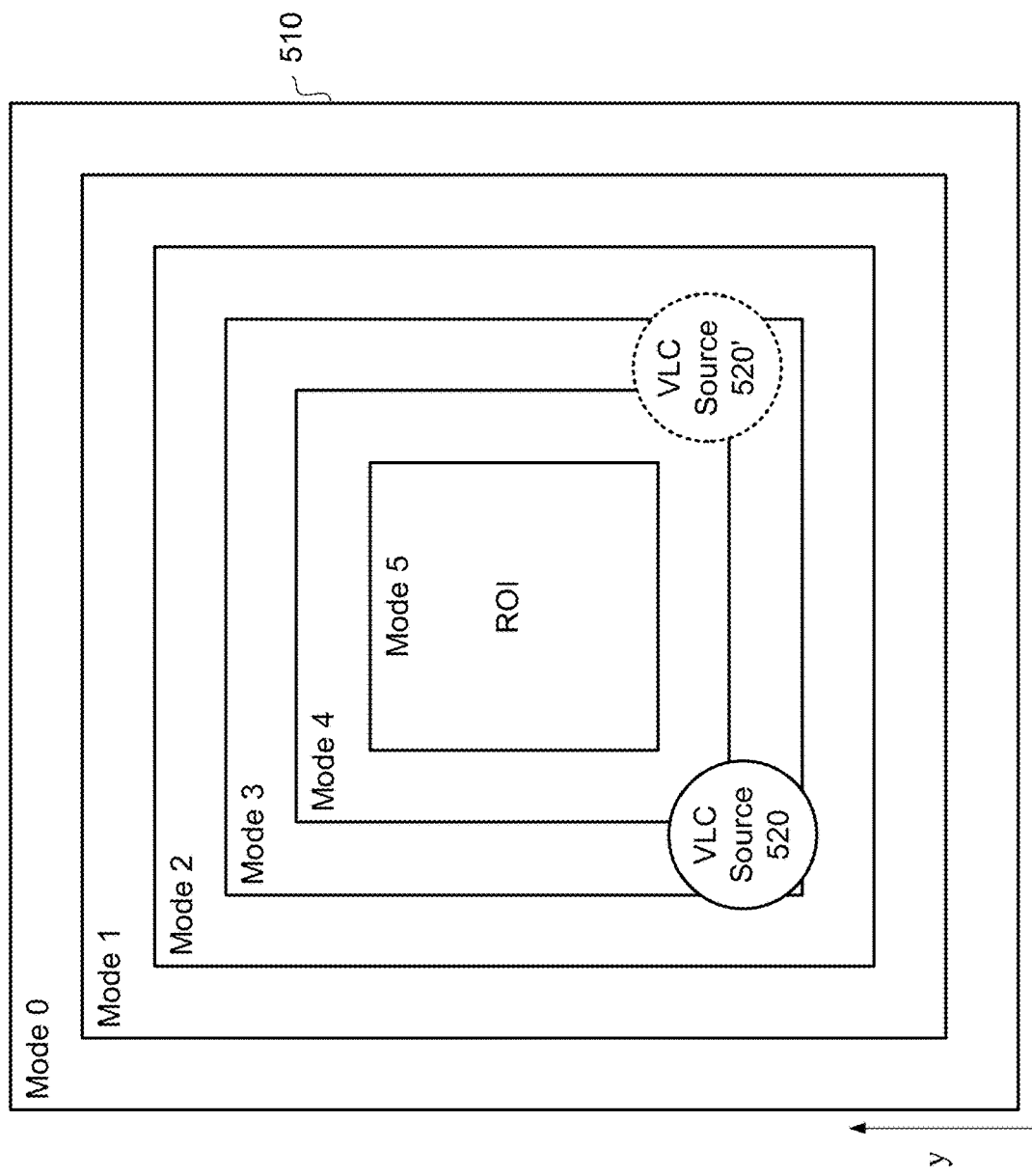
FIG. 5A illustrates example operational modes of an example image sensor at different voltage corners, according to certain aspects of the present disclosure.
FIG. 5B illustrates example regions of interest for different operational modes of an image sensor and an example images of a VLC light source on the image sensor, according to certain aspects of the present disclosure.

FIG. 5A illustrates example operational modes of an example image sensor at different ISP voltage corners, according to certain aspects of the present disclosure. In the example shown in FIG. 5A, the operational voltage of the ISP may include six different levels, such as sys, sys+, nom, nom+, high, and turbo levels, where the sys level may correspond to the lowest operational voltage level while the turbo level may correspond to the highest operational voltage level. Each of the six operational levels of the ISP may correspond to a different operational mode (i.e., pixel array size or resolution) 0, 1, 2, 3, 4, or 5 of the image sensor. For example, when the voltage level of the ISP is set to the turbo (highest) level, the image sensor of the camera may be configured by the sensor driver circuit to operate in mode 0, where, for example, the full size of the pixel array of the image sensor (e.g., 2 k×2 k) may be activated and used; when the voltage level of the ISP is set to the sys (lowest) level, the image sensor of the camera may be configured by the sensor driver circuit to operate in mode 5, where only a small portion of the pixel array of the image sensor (e.g., 480×320) may be activated and used.

FIG. 5B illustrates example regions of interest for different operational modes of an image sensor 510 and example images of a VLC light source on the image sensor, according to certain aspects of the present disclosure. In the example shown in FIG. 5B, image sensor 510 may have 6 different operational modes 0-5, each of which may correspond to a different operational voltage level of the image signal processor as shown in FIG. 5A. In each operational mode, a different number of pixels are activated and used, where the region in which the pixels are activated may be referred to as the region of interest (ROI) for the operational mode. For example, in mode 0, the ROI includes the full area of image sensor 510 and all the pixels of image sensor 510 may be activated and read to generate the image frame. In mode 5, the ROI only includes a center portion of the pixel array in image sensor 510 and only the center portion of the pixel array in image sensor 510 may be activated and read to generate the image frame. In each of modes 0-5, the ROI includes the center of image sensor 510, and the pixels in the center of image sensor 510 are activated and read. Therefore, the ROI for mode 0 includes the ROI for mode 1, the ROI for mode 1 includes the ROI for mode 2, . . . , and the ROI for mode 4 includes the ROI for mode 5.

FIG. 5B also shows an image 520 of the VLC source on an area of the pixel array of the image sensor, where image 520 of the VLC source is located within the ROI of mode 2, 1, or 0, but at least some portions of image 520 of the VLC source is located outside of the ROIs of mode 5, 4, or 3. Thus, for the example shown in FIG. 5B, to fully capture the image of the VLC source, image sensor 510 of the camera would operate in mode 2, mode 1, or mode 0. To reduce power consumption and reduce data of little or no use, image sensor 510 of the camera would preferably operate in mode 2.

IV. Example Methods for Dynamic Control of Operational Mode of Image Sensor

In order to reduce the power consumption of the mobile device and increase the data sampling rate during VLC communications, the image sensor of the camera on the mobile device may be dynamically configured by the sensor driver circuit to operate in different modes with pixels in different ROIs activated, based on the position of the image of the VLC source on the image sensor and by setting different supply voltage levels for the ISP (and/or the sensor driver circuit). For example, in the example shown in FIG. 5B, to reduce power consumption and reduce data of little or no use, the image sensor of the camera may be configured to operate in mode 2.

Figure 6:
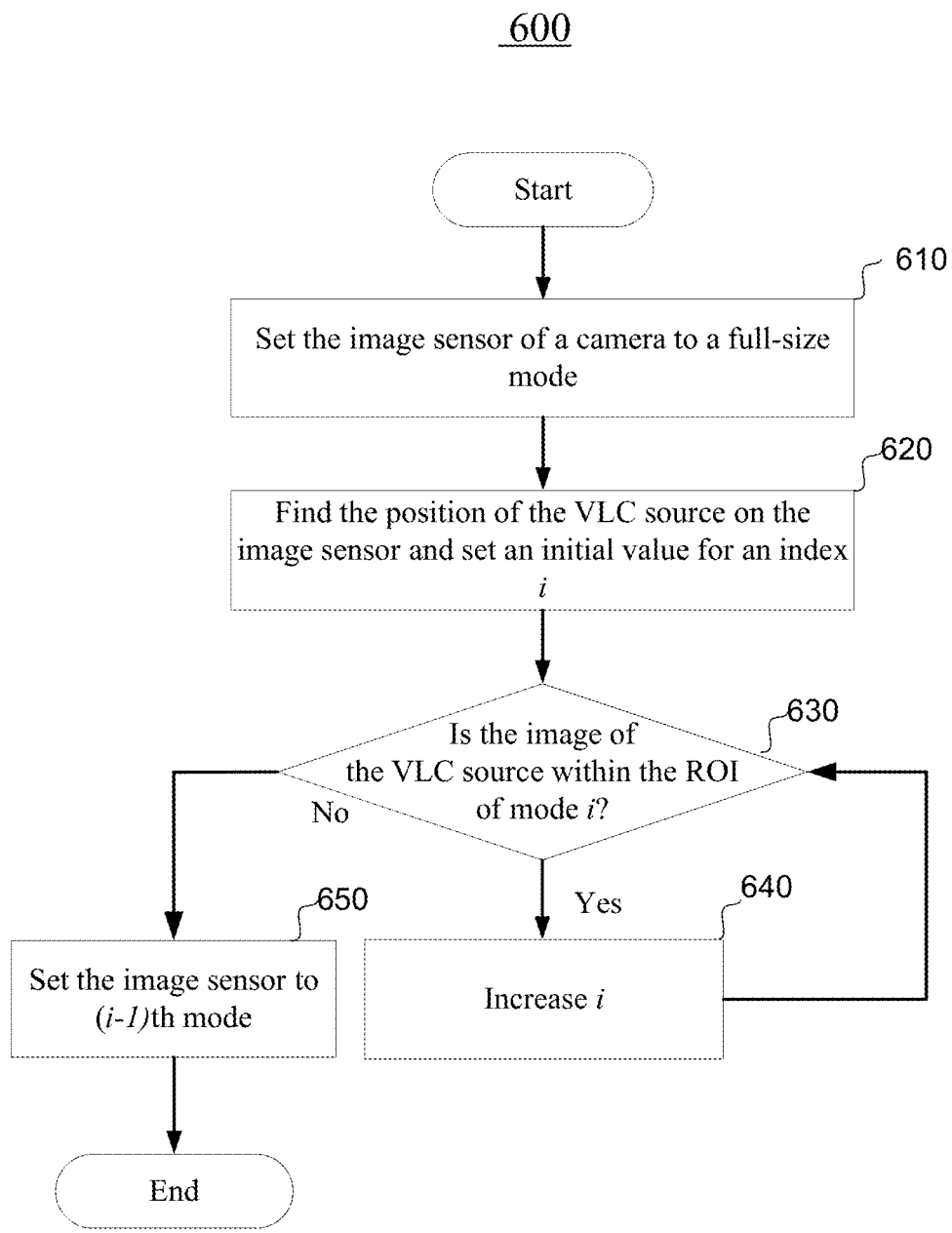
FIG. 6 is a flow chart illustrating an example method for dynamically configuring the operational mode of an image sensor based on the position of an image of the VLC light source on the image sensor, according to certain aspects of the present disclosure.

FIG. 6 is a flow chart illustrating an example flow 600 for selecting the appropriate mode of the image sensor of a camera on a mobile device for VLC communications, according to certain aspects of the present disclosure. In various embodiments, the operations in flow 600 may be performed by, for example, processing circuit 210 of FIG. 2, an ISP, or processing unit 1010 described below with respect to FIG. 10.

At block 610, flow 600 may start by setting the image sensor of the camera on the mobile device to a full-size mode (i.e., mode 0 in FIG. 5B). The full-size mode may be set by, for example, setting the supply voltage level of the ISP (and/or the sensor driver circuit) of the camera at the turbo level as shown in FIG. 5A.

At block 620, the captured image in the full-size mode may be processed by a processing circuit, such as processing circuit 210 of FIG. 2 or an image signal processor, to find the position of the image of the VLC source on the image sensor. For example, the processing unit may recognize the VLC source in the captured image based on the shape or the brightness of the VLC source, and determine the coordinates of the pixels corresponding to the image of the VLC source. In one embodiment, the minimum and maximum coordinates of the image of the VLC source on the pixel array in both x-axis and y-axis may be determined, which may define a rectangle that includes the full image of the VLC source. In some embodiments, the coordinates of the center of the image of the VLC source and a radius of the image of the VLC source on the image sensor may be determined. At block 620, an initial value for an index i may also be set. For example, if the image sensor starts at the full-size mode (i.e., mode 0), index i may be set to 1.

At block 630, based on the determined position of the image of the VLC source on the image sensor, the processing circuit may determine whether the image of the VLC source is within the ROI of mode i. In one embodiment, the processing circuit may compare the rectangle defined by the minimum and maximum coordinates of the image of the VLC source on the pixel array against the ROI for mode i. For example, if the minimum and maximum coordinates of the ROI for mode i are $(-x1, x1)$ in the x-axis and $(-y1, y1)$ in the y-axis, and the minimum and maximum coordinates of the image of the VLC source on the pixel array are $(xa, xb)$ in the x-axis and $(ya, yb)$ in the y-axis, the processing circuit may determine that the ROI for mode i fully covers the rectangle when both xa and xb are greater than $-x1$, but less than x1 and both ya and yb are greater than $-y1$ but less than y1. If any one of xa and xb is less than $-x1$ or greater than x1, or any one of ya and yb is less than $-y1$ or greater than y1, the ROI for mode i may not fully cover the rectangle. If the ROI for mode i fully covers the rectangle, flow 600 may proceed to block 640. If at least a portion of the rectangle is not covered by the ROI for mode i, flow 600 may proceed to block 650.

At block 640, the index i may be increased by a step, such as 1, and flow 600 may go back to block 630 to determine whether the image of the VLC source is within the ROI of the new mode i. For example, if the ROI for mode 1 fully covers the rectangle defined by the minimum and maximum coordinates of the image of the VLC source on the pixel array, i may be set to 2, and flow 600 may go back to block 630 to determine if the image of the VLC source is within the ROI of mode 2. The operations in block 630 and 640 may be repeated. At any i value, if it is determined at block 630 that any portion of the image of the VLC source is not within the ROI of mode i, flow 600 may proceed to block 650.

At block 650, the image sensor of the camera may be set to the (i−1)th mode. For example, if the current i value is 4, which may indicate that the image of the VLC source is within the ROI of mode 3 but not within the ROI of mode 4, the image sensor of the camera may be set to mode 3, for example, by setting the voltage level of the ISP (and/or the sensor driver circuit) to the corresponding level (e.g., nom as shown in FIG. 5A).

Thus, for the example shown in FIG. 5B, the image sensor may be set to mode 0 (full-size mode) first to capture image 520 of the VLC source at block 610. At block 620, the processing circuit may find the position of the image of the VLC source on the image sensor, and the index i may be set to 1. At block 630, it may be determined that image 520 of the VLC source is within the ROI of mode 1, and index i may be increased to 2 at block 640. It may then be determined at block 630 again that image 520 of the VLC source is within the ROI of mode 2, and index i may be increased to 3 at block 640. It may then be determined at block 630 that at least a portion of image 520 of the VLC source is not within the ROI of mode 3, and the image sensor may be set to operate in mode 2, for example, by setting the supply voltage level of the ISP (and other circuits) to the nom+ level, in order to fully capture image 520 of the VLC source while minimizing the number of pixels activated and used.

It is noted that even though FIG. 6 describes the operations as a sequential process, some of the operations may be performed in parallel or concurrently. In addition, the order of the operations may be rearranged. An operation may have additional steps not included in the figure. Some operations may be optional, and thus may be omitted in various embodiments. Some operations described in one block may be performed together with operations described at another block. Additional operations may be added. Furthermore, embodiments of the methods may be implemented in hardware, software, firmware, middleware, microcode, hardware description languages, or any combination thereof.

It will be apparent to those skilled in the art that substantial variations may be made to flow 600 shown in FIG. 6. For example, in some implementations, the image sensor may be initially set to a mode other than the full-size mode, for example, mode 3 rather than mode 0. In some embodiments, the initial value of index i may be set to, for example, 3. If it is determined that the image of the VLC source is within the ROI of mode i, the value of i may be increased; otherwise the value of i may be decreased.

As described above, the VLC data may be transmitted by modulating the light generated by the VLC source. As also described above with respect to FIG. 4, in the line-by-line reading scheme using a rolling shutter, each row is read at a different time, and thus the readout signal from each row may represent the VLC data transmitted at a different time. Therefore, the VLC data transmitted at any given time can be received by reading out any row on the image of the VLC source on the image sensor. In other words, if the mobile device is not moving, the VLC data transmitted by the VLC source can be received by reading out a single row on the image of the VLC source on the image sensor. As such, in some embodiments, the VLC data may be received without reading all rows on the image of the VLC source on the image sensor.

For example, in the example shown in FIG. 5B, it may be possible to receive VLC data by capturing image 520 of the VLC source using mode 3, rather than mode 2, even though the ROI of mode 3 does not fully cover the full image 520 of the VLC source. Thus, block 630 of flow 600 in FIG. 6 may be modified to determine whether the portion (area) of the image of the VLC source within the ROI of mode i is greater than a threshold value (e.g., 80%) of the full image of the VLC source. If the portion of the image of the VLC source within the ROI of mode i is greater than the threshold value of the full image of the VLC source, flow 600 may proceed to block 640; otherwise, flow 600 may proceed to block 650.

In some embodiments, the VLC data may be received without reading all pixels on a row on the image of the VLC source on the image sensor. For example, as also shown in FIG. 5B, it may be possible to receive VLC data by capturing image 520' of the VLC source using mode 3, rather than mode 2, even though the ROI of mode 3 does not fully cover image 520' of the VLC source. Thus, in some embodiments, block 630 of flow 600 in FIG. 6 may be modified to determine whether the minimum and maximum coordinates of the image of the VLC source on the y-axis are both within the minimum and maximum coordinates of the ROI of mode i on the y-axis, and whether the portion (area) of the image of the VLC source within the ROI of mode i is greater than a threshold value (e.g., 50%) of the full image of the VLC source. The VLC data may be adequately captured by the image sensor in an operational mode that satisfies both of these two tests.

Figure 7:
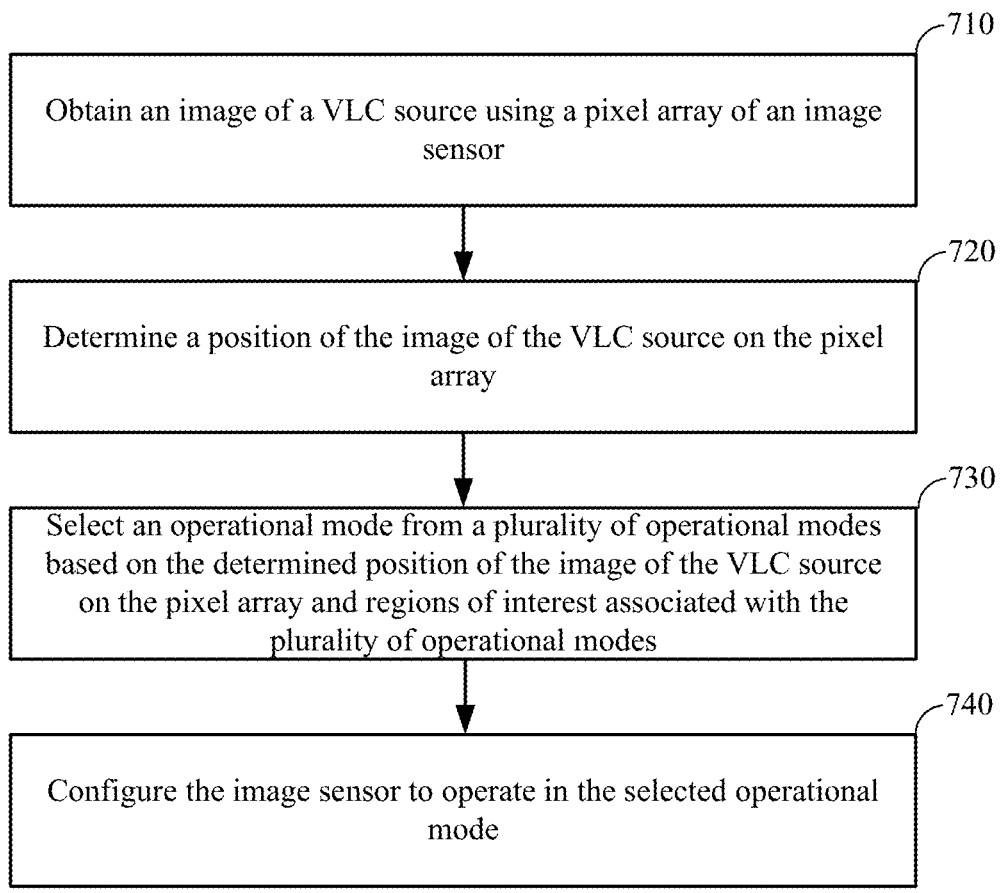
FIG. 7 is a flow chart illustrating a method of visible light communication using an image sensor on a mobile device, according to certain aspects of the present disclosure.

FIG. 7 is a flow chart 700 illustrating a method of visible light communication using an image sensor on a mobile device, according to certain aspects of the present disclosure. In various embodiments, means for performing the operations in blocks 710-740 of flow chart 700 may include, for example, processing circuit 210 of FIG. 2, an ISP, or processing unit 1010 described below with respect to FIG. 10.

At block 710, a processing unit, such as an image signal processor, may obtain an image of a VLC source using the image sensor. The image sensor may include a pixel array and may be operable in a plurality of operational modes. In each operational mode of the plurality of operational modes, the image sensor may be configured to capture light in a different region of interest of the pixel array associated with the operational mode, where each ROI includes the center of the pixel array.

At block 720, the processing unit may determine a position of the image of the VLC source on the pixel array. For example, the processing unit may recognize the VLC source in the obtained image based on the shape or the brightness of the VLC source, and determine the coordinates of the pixels corresponding to the image of the VLC source.

At block 730, the processing unit may select an operational mode from the plurality of operational modes based on the determined position of the image of the VLC source on the pixel array and the ROIs associated with the plurality of operational modes as described above with respect to FIG. 6. The selected operational mode may have the smallest ROI among the operational modes that have ROIs covering the full image of the VLC source on the pixel array.

At block 740, the processing unit may configure the image sensor to operate in the selected operational mode, for example, by setting the voltage level of the ISP to the corresponding level and/or instructing the sensor driver circuit to operate the image sensor in the selected operational mode as described above with respect to FIGS. 5A and 5B.

It is noted that even though FIG. 7 describes the operations as a sequential process, some of the operations may be performed in parallel or concurrently. An operation may have additional steps not included in the figure. Some operations may be optional, and thus may be omitted in various embodiments. Some operations described in one block may be performed together with operations described at another block. Additional operations may be added. Furthermore, embodiments of the methods may be implemented in hardware, software, firmware, middleware, microcode, hardware description languages, or any combination thereof.

V. Determining Operational Mode Based on Movement of Mobile Device

In some implementations, the mobile device may include one or more Inertial Measurement Units (IMUs), such as accelerometers, gyroscopes, or other motion sensors. Thus, the relative movement of the mobile device from a previous location may be determined based on the measurement results of the inertial measurement units. Additionally or alternatively, the Angle Of Arrival (AOA) of the light from the VLC source to the mobile device at a given location may be determined, for example, as described in U.S. Publication No. 2014/0375982. Based on the previous location of the mobile device and/or the corresponding AOA, and the relative movement of the mobile device from the previous location, the AOA at the new location and thus the relative shift of the image of the VLC source on the image sensor may be estimated without capturing and processing a new full-size image at the new location. Based on the estimation, the appropriate operational mode of the image sensor at the new location may then be determined and set as described above, without performing some or all operations described above with respect to FIG. 6 or 7.

Figure 8:
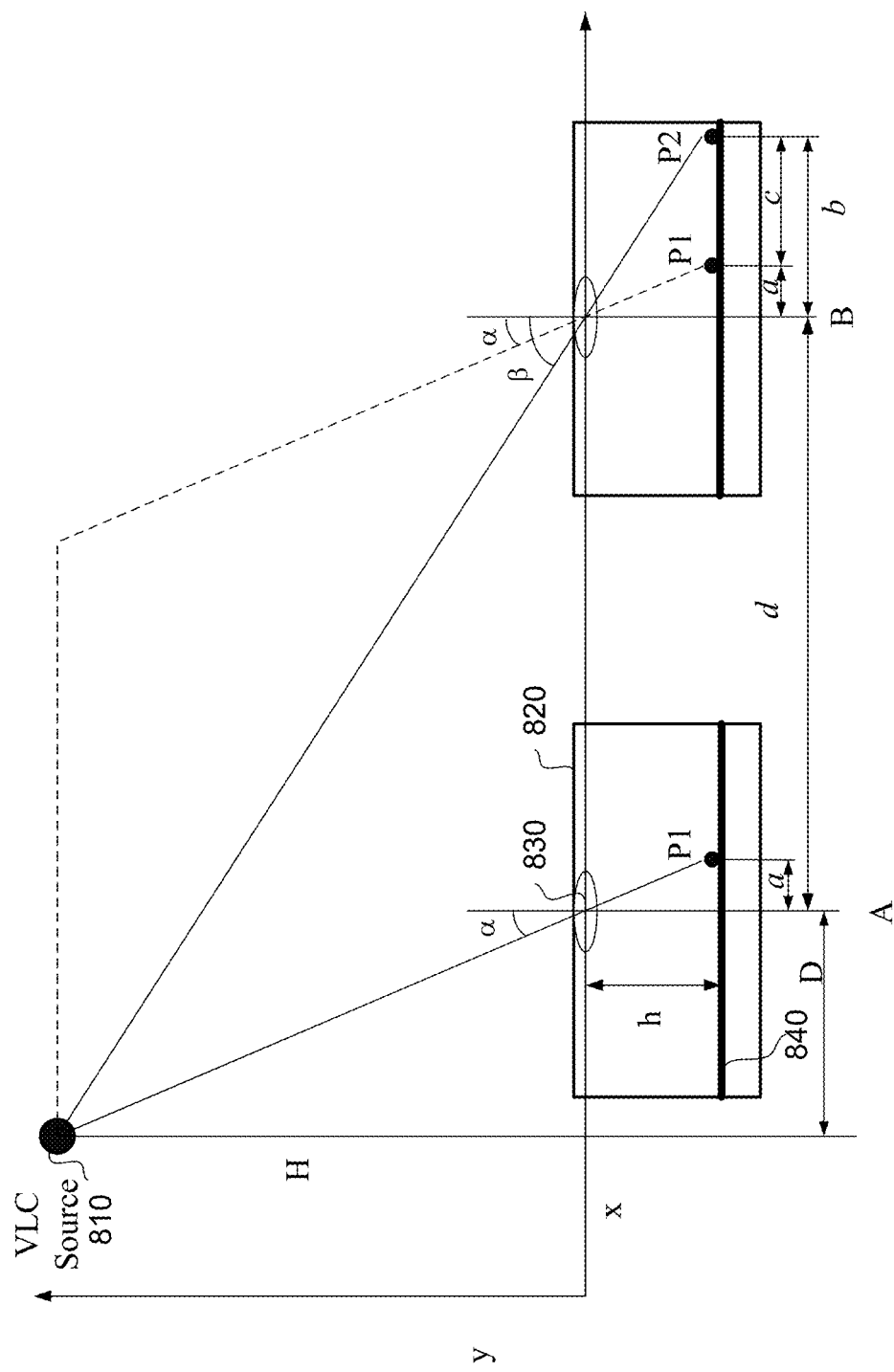
FIG. 8 illustrates the change of position of an image of a VLC light source on an image sensor of a mobile device as the location of the mobile device changes, according to certain aspects of the present disclosure.

FIG. 8 illustrates the change of position of an image of a VLC source 810 on an image sensor 840 of a mobile device 820 as the location of mobile device 820 changes, according to certain aspects of the present disclosure. As shown in FIG. 8, at physical location A, mobile device 820 may form, through a lens 830, an image of VLC source 810 at position P1 on image sensor 840, and the AOA α of the light from VLC source 810 may be determined by $$\alpha = \arctan\left(\frac{a}{h}\right),$$

where a is the offset of position P1 from the centroid of image sensor 840 and h is the distance between lens 830 and image sensor 840. As described above, based on the locations of one or more VLC sources and the angles of arrival of the light from the one or more VLC sources, mobile device 820 may determine its location (location A). As such, the distances between mobile device 820 and VLC source 810 in the x-axis (D) and/or y-axis (H) may be determined.

When mobile device 820 is moved (e.g., in the x direction) from location A to location B, the distance d of the movement may be measured using the inertial measurement units. The AOA β of the light from VLC source 810 to mobile device 820 at location B may be determined by $$\beta = \arctan\left(\frac{D+d}{H}\right).$$

The image of VLC source 810 may be formed, by lens 830, at position P2 on image sensor 840. The offset b of position P2 from the centroid of image sensor 840 may be determined, for example, by b=tan(β)×h. Additionally or alternatively, a distance c between position P1 and position P2 may be determined by c=(tan(β)tan(α))×h. Based on position P1 or the operational mode of the image sensor used (e.g., determined according to flow 600) when mobile device was at location A, and offset b or distance c, the operational mode of the image sensor to be used when mobile device is at location B may be determined.

It is noted that although FIG. 8 only shows the movement of the mobile device in one dimension, similar methods can be used to determine the position of the VLC source on the image sensor of the mobile device and the appropriate operational mode for the image sensor when the mobile device is moved in two dimensions or three dimensions.

Figure 9:
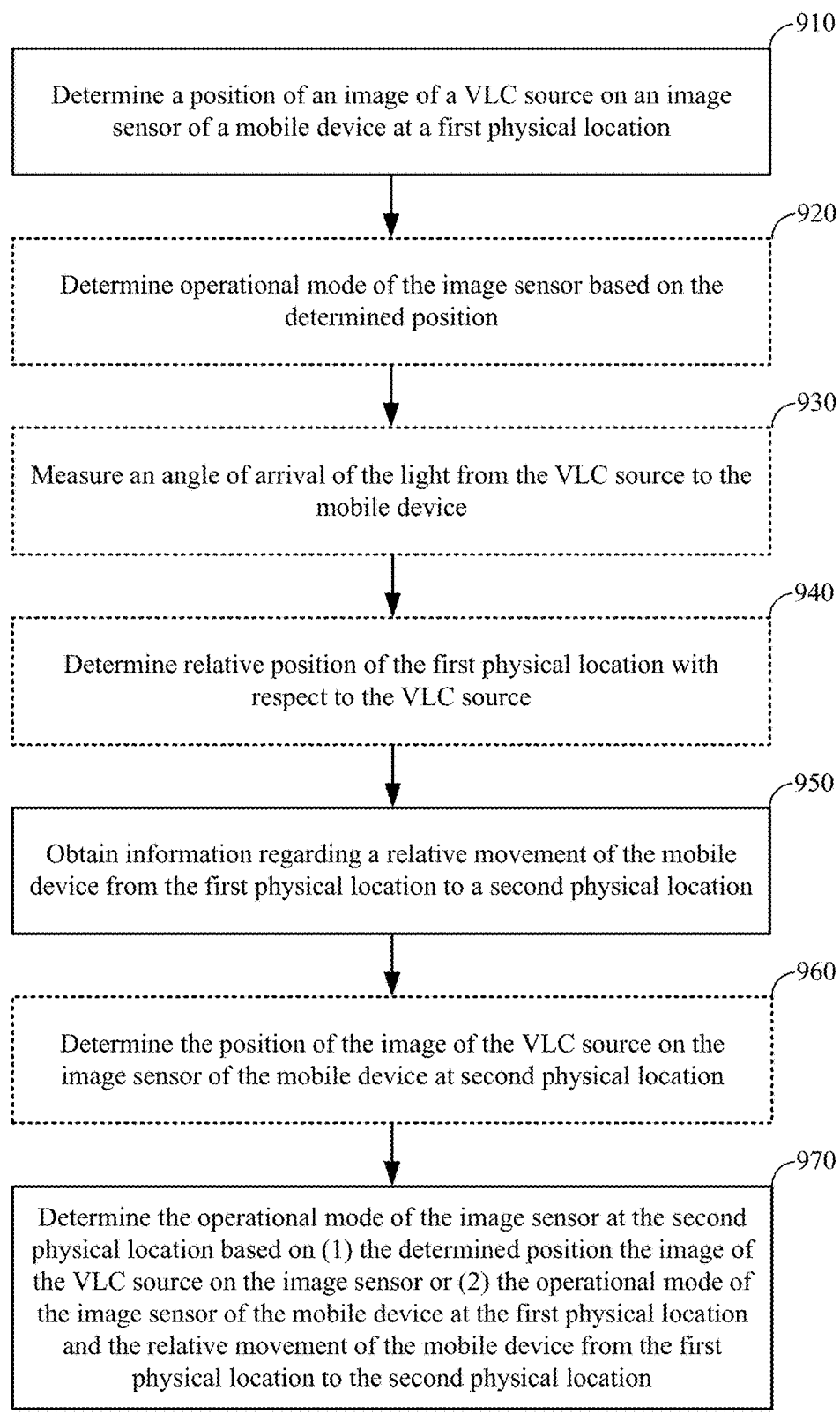
FIG. 9 is a flow chart illustrating an example method for determining the operational mode of an image sensor of a mobile device, according to certain aspects of the present disclosure.

FIG. 9 is a flow chart illustrating an example method 900 for determining the operation mode of an image sensor of a mobile device based on the movement of the mobile device and the previous position of a VLC light source on the image sensor (or the previous operational mode of the image sensor), according to certain aspects of the present disclosure. In various embodiments, means for performing the operations in blocks 910-970 of method 900 may include by, for example, processing circuit 210 of FIG. 2, an ISP, or processing unit 1010 described below with respect to FIG. 10.

At block 910, a processing unit, such as an image signal processor, may determine a position of an image of a VLC source on an image sensor of a mobile device at a first physical location as described above with respect to block 620 in FIG. 6 or block 710 in FIG. 7.

Optionally, at block 920, the processing unit may determine the appropriate operational mode of the image sensor based on the determined position of the image of the VLC source on the image sensor as described above with respect to blocks 620-650 of flow 600.

Optionally, at block 930, the processing unit may measure an angle of arrival of the light from the VLC source to the mobile device at the first physical location. For example, as described above with respect to FIG. 8, the angle of arrival may be determined based on the position of the image of the VLC source on the image sensor and a distance between the lens and the image sensor.

Optionally, at block 940, the processing unit may determine the absolute position of the first physical location or the relative position of the first physical location with respect to the VLC source based on, for example, the angle of arrival of the light from one or more VLC sources, using techniques such as triangulation or trilateration technique.

At block 950, the processing unit may obtain information regarding a relative movement of the mobile device from the first physical location to a second physical location. The relative movement information may be collected by one or more inertial measurement units, such as accelerometers, gyroscopes, or other motion sensors.

Optionally, at block 960, the processing unit may determine the position of the image of the VLC source on the image sensor of the mobile device at the second physical location based on the position of the image of the VLC source on the image sensor of the mobile device at the first physical location and the relative movement of the mobile device from the first physical location to the second physical location, as described above with respect to FIG. 8.

At block 970, the processing unit may determine the appropriate operational mode of the image sensor at the second physical location based on the determined position of the image of the VLC source on the image sensor as described above with respect to FIG. 6. In some embodiments, the processing unit may determine the appropriate operational mode of the image sensor at the second physical location based on the operational mode of the image sensor of the mobile device at the first physical location and the relative movement of the mobile device from the first physical location to the second physical location, using the ROIs of the different operational modes of the image sensor.

It is noted that even though FIG. 9 describes the operations as a sequential process, some of the operations may be performed in parallel or concurrently. In addition, the order of the operations may be rearranged. An operation may have additional steps not included in the figure. Some operations may be optional, and thus may be omitted in various embodiments. Some operations described in one block may be performed together with operations described at another block. Additional operations may be added. Furthermore, embodiments of the methods may be implemented in hardware, software, firmware, middleware, microcode, hardware description languages, or any combination thereof.

VI. Example Devices and Systems

Figure 10:
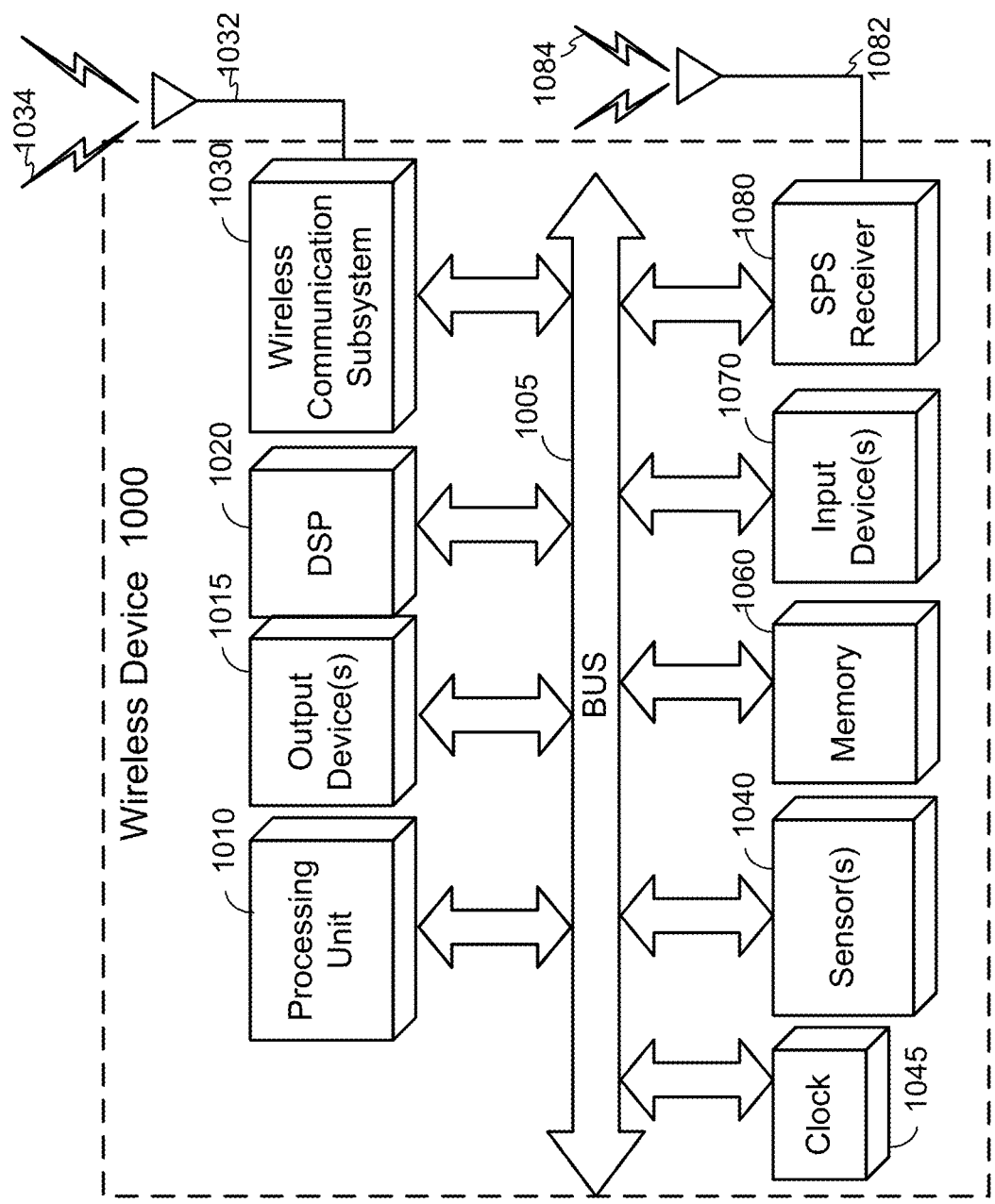
FIG. 10 is a block diagram of an example wireless device for implementing some of the examples described herein.

FIG. 10 illustrates an embodiment of a wireless device 1000, which can be utilized as described herein above. For example, wireless device 1000 can be used in mobile device 120, 200, or 820, or can be used to perform at least some operations described above with respect to FIGS. 6, 7, and 9. It should be noted that FIG. 10 is meant only to provide a generalized illustration of various components, any or all of which may be utilized as appropriate.

Wireless device 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as digital signal processing chips, graphics acceleration processors, application specific integrated circuits (ASICs), and/or the like), and/or other processing structure or means, which can be configured to perform one or more of the methods described herein, such as determining the position of the image of the VLC source on the image sensor or the appropriate operational mode of the image sensor. As shown in FIG. 10, some embodiments may have a separate digital signal processor (DSP) 1020, depending on desired functionality. Wireless device 1000 also can include one or more input devices 1070, which can include without limitation a touch pad, button(s), dial(s), switch(es), and/or the like; and one or more output devices 1015, which can include without limitation light emitting diodes (LEDs), speakers, and/or the like. For example, the LEDs may be used to transmit VLC signals.

Wireless device 1000 might also include a wireless communication subsystem 1030, which can include without limitation a wireless communication device, and/or a chipset (such as a Bluetooth device, an International Electrical and Electronics Engineers (IEEE) 802.11 device (e.g., a device utilizing one or more of the 802.11 standards described herein), an IEEE 802.15.4 device, a WiFi device, a WiMax device, cellular communication facilities, etc.), and/or the like. Wireless communication subsystem 1030 may permit data to be exchanged with a network, wireless access points, other computer systems, and/or any other electronic devices described herein, such as a mobile device or a remote controller. The communication can be carried out via one or more wireless communication antenna(s) 1032 that send and/or receive wireless signals 1034. In various embodiments, wireless communication subsystem 1030 may be used as transmitter 250 and receiver 240.

Depending on the desired functionality, wireless communication subsystem 1030 can include separate transceivers to communicate with antennas of base transceiver stations and other wireless devices and access points as described above, which may include communicating with different data networks and/or network types, such as wireless wide-area networks (WWANs), wireless local area networks (WLANs), or wireless personal area networks (WPANs). A WWAN may be a network using any air interface technology, for example, a code division multiple access (CDMA) network, a Time Division Multiple Access (TDMA) network, a Frequency Division Multiple Access (FDMA) network, an OFDMA network, a Single-Carrier Frequency Division Multiple Access (SC-FDMA) network, a WiMax (IEEE 802.16), and so on. A CDMA network may implement one or more radio access technologies (RATs) such as cdma2000, W-CDMA, and so on. Cdma2000 includes IS-95, IS-2000, and/or IS-856 standards. A TDMA network may implement GSM, Digital Advanced Mobile Phone System (D-AMPS), or some other RATs. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network. A WPAN may be a Bluetooth network, an IEEE 802.15x, or some other type of network.

Wireless device 1000 may include a clock 1045 on bus 1005, which can generate a signal to synchronize various components on bus 1005. Clock 1045 may include an inductor-capacitor (LC) oscillator, a crystal oscillator, a ring oscillator, a digital clock generator such as a clock divider or clock multiplexer, a phase locked loop, or other clock generator. Clock 1045 may be synchronized (or substantially synchronized) with corresponding clocks on other wireless devices for data communication. Clock 1045 may be driven by wireless communication subsystem 1030, which may be used to synchronize clock 1045 of wireless device 1000 to one or more other devices. Clock 1045 may be used as the time base or reference for synchronizing different components of wireless device 1000.

Wireless device 1000 can further include sensor(s) 1040. Such sensors can include, without limitation, one or more acoustic sensor(s), accelerometer(s), gyroscope(s), camera(s), magnetometer(s), altimeter(s), microphone(s), proximity sensor(s), light sensor(s), and the like. Some or all of sensor(s) 1040 can be utilized, among other things, for light signal detection, motion detection, and positioning.

Embodiments of the mobile device may also include a Standard Positioning Service (SPS) receiver 1080 capable of receiving signals 1084 from one or more SPS satellites using an SPS antenna 1082. SPS receiver 1080 can extract a position of the mobile device, using conventional techniques, from SPS satellite vehicles (SVs) of an SPS system, such as global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, SPS receiver 1080 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS system may include any combination of one or more global and/or regional navigation satellite systems and/or augmentation systems, and SPS signals may include SPS, SPS-like, and/or other signals associated with one or more such SPS systems. SPS receiver 1080 may be used to determine a geographic location of the wireless device.

Wireless device 1000 may further include and/or be in communication with a memory 1060. Memory 1060 may include any non-transitory storage device, and may include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like. For instance, memory 1060 may include a database (or other data structure) configured to store information such as the ROIs for different operational mode.

Memory 1060 of wireless device 1000 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above, such as the method shown in FIGS. 6, 7, and 9 might be implemented as code and/or instructions that can be stored or loaded in memory 1060 and be executed by wireless device 1000, a processing unit within wireless device 1000, and/or another device of a wireless system. In an aspect, such code and/or instructions can be used to configure and/or adapt a general purpose computer (or other device) to perform one or more operations in accordance with the described methods.

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method of visible light communication (VLC) using an image sensor of a camera on a mobile device, the method comprising:
   obtaining a first image frame including an image of a VLC source using the image sensor, the image sensor comprising a pixel array and configurable to operate in any of a plurality of operational modes, wherein, in each operational mode of the plurality of operational modes, the image sensor is operable to activate only pixels in a different respective region of interest (ROI) of the pixel array to capture light signals, each ROI including a center region of the pixel array;
   determining a first position of the image of the VLC source on the pixel array;
   selecting a first operational mode from the plurality of operational modes based on the determined first position of the image of the VLC source on the pixel array and the ROIs associated with the plurality of operational modes, the first operational mode having the smallest ROI among ROIs of the plurality of operational modes that include at least a portion of the image of the VLC source on the pixel array in the first image frame; and
   configuring the image sensor to operate in the first operational mode.

2. The method of claim 1, wherein the portion of the image of the VLC source on the pixel array includes at least 50% of the image of the VLC source on the pixel array.

3. The method of claim 1, wherein the portion of the image of the VLC source on the pixel array includes 100% of the image of the VLC source on the pixel array.

4. The method of claim 1, wherein determining the first position of the image of the VLC source on the pixel array comprises:
   determining a minimum coordinate and a maximum coordinate of the image of the VLC source on the pixel array in each dimension of two dimensions of the pixel array.

5. The method of claim 4, wherein selecting the first operational mode from the plurality of operational modes comprises:
   comparing the determined minimum coordinate and maximum coordinate of the image of the VLC source on the pixel array in each dimension of the two dimensions of the pixel array with the ROI associated with each operational mode of the plurality of operational modes in descending order of a size of the ROI associated with each mode, until one or more of the determined minimum and maximum coordinates of the image of the VLC source on the pixel array in the two dimensions of the pixel array are outside of the ROI associated with an operational mode of the plurality of operational modes.

6. The method of claim 1, wherein:
   each of the plurality of operational modes corresponds to a different operational voltage of a control circuit of the image sensor; and
   configuring the image sensor to operate in the first operational mode comprises applying a corresponding operational voltage to the control circuit of the image sensor.

7. The method of claim 6, wherein the control circuit comprises an image signal processor or a driver circuit for the image sensor.

8. The method of claim 1, wherein the camera comprises a rolling shutter.

9. The method of claim 8, wherein obtaining the image of the VLC source using the image sensor comprises reading the pixel array of the image sensor line-by-line using the rolling shutter.

10. The method of claim 1, further comprising:
    obtaining information regarding a relative movement of the mobile device; and
    selecting a second operational mode from the plurality of operational modes based on the relative movement of the mobile device and at least one of the first position or the first operational mode.

11. The method of claim 10, further comprising:
determining an angle of arrival of light from the VLC source to the mobile device after the relative movement of the mobile device, based on the relative movement of the mobile device.

12. The method of claim 10, further comprising:
determining a second position of the image of the VLC source on the pixel array or a relative shift of the second position from the first position, based on the relative movement of the mobile device.

13. A camera of a mobile device, the camera comprising:
an image sensor comprising a pixel array and configurable to operate in any of a plurality of operational modes, wherein, in each operational mode of the plurality of operational modes, the image sensor is operable to activate only pixels in a different respective region of interest (ROI) of the pixel array to capture light signals, each ROI including a center region of the pixel array; and
an image signal processor comprising instructions stored thereon, the instructions, when executed by the image signal processor, causing the image signal processor to:
obtain a first image frame including an image of a VLC source using the image sensor;
determine a first position of the image of the VLC source on the pixel array;
select a first operational mode from the plurality of operational modes based on the determined first position of the image of the VLC source on the pixel array and the ROIs associated with the plurality of operational modes, the first operational mode having the smallest ROI among ROIs of the plurality of operational modes that include at least a portion of the image of the VLC source on the pixel array in the first image frame; and
configure the image sensor to operate in the first operational mode.

14. The camera of claim 13, wherein the portion of the image of the VLC source on the pixel array includes at least 50% of the image of the VLC source on the pixel array.

15. The camera of claim 13, wherein the portion of the image of the VLC source on the pixel array includes 100% of the image of the VLC source on the pixel array.

16. The camera of claim 13, wherein the first position of the image of the VLC source on the pixel array comprises a minimum coordinate and a maximum coordinate of the image of the VLC source on the pixel array in each dimension of two dimensions of the pixel array.

17. The camera of claim 16, wherein the instructions causing the image signal processor to select the first operational mode from the plurality of operational modes comprise instructions for:
comparing the minimum coordinate and maximum coordinate of the image of the VLC source on the pixel array in each dimension of the two dimensions of the pixel array with the ROI associated with each operational mode of the plurality of operational modes in descending order of a size of the ROI associated with each mode, until one or more of the minimum and maximum coordinates of the image of the VLC source on the pixel array in the two dimensions of the pixel array are outside of the ROI associated with an operational mode of the plurality of operational modes.

18. The camera of claim 13, wherein:
each of the plurality of operational modes corresponds to a different operational voltage of a driver circuit of the image sensor; and the instructions causing the image signal processor to configure the image sensor to operate in the first operational mode comprise instructions for applying a corresponding operational voltage to the driver circuit of the image sensor.

19. The camera of claim 13, further comprising:
a rolling shutter configured to expose one or more lines of the pixel array at a time.

20. The camera of claim 13, wherein the instructions, when executed by the image signal processor, further cause the image signal processor to:
obtain information regarding a relative movement of the mobile device; and
select a second operational mode from the plurality of operational modes based on the relative movement of the mobile device and at least one of the first position or the first operational mode.

21. An apparatus comprising:
means for obtaining a first image frame including an image of a VLC source, the means for obtaining the image of the VLC source comprising a pixel array and operable in any of a plurality of operational modes, wherein, in each operational mode of the plurality of operational modes, the means for obtaining the image of the VLC source is operable to capture light signals activate only pixels in a different respective region of interest (ROI) of the pixel array to capture light signals, each ROI including a center region of the pixel array;
means for determining a first position of the image of the VLC source on the pixel array;
means for selecting a first operational mode from the plurality of operational modes based on the determined first position of the image of the VLC source on the pixel array and the ROIs associated with the plurality of operational modes, the first operational mode having the smallest ROI among ROIs of the plurality of operational modes that include at least a portion of the image of the VLC source on the pixel array in the first image frame; and
means for configuring the means for obtaining the image of the VLC source to operate in the first operational mode.

22. The apparatus of claim 21, wherein the portion of the image of the VLC source on the pixel array includes at least 50% of the image of the VLC source on the pixel array.

23. The apparatus of claim 21, wherein the portion of the image of the VLC source on the pixel array includes 100% of the image of the VLC source on the pixel array.

24. The apparatus of claim 21, wherein:
the means for determining the first position of the image of the VLC source on the pixel array comprises means for determining a minimum coordinate and a maximum coordinate of the image of the VLC source on the pixel array in each dimension of two dimensions of the pixel array; and
the means for selecting the first operational mode comprises means for comparing the determined minimum coordinate and maximum coordinate of the image of the VLC source on the pixel array in each dimension of the two dimensions of the pixel array with the ROI associated with each operational mode of the plurality of operational modes in descending order of a size of the ROI associated with each mode, until one or more of the determined minimum and maximum coordinates of the image of the VLC source on the pixel array in the two dimensions of the pixel array are outside of the ROI associated with an operational mode of the plurality of operational modes.

25. The apparatus of claim 21, wherein:
each of the plurality of operational modes corresponds to a different operational voltage of a driver circuit of the means for obtaining the image of the VLC source; and
the means for configuring the means for obtaining the image of the VLC source to operate in the first operational mode comprises means for applying a corresponding operational voltage to the driver circuit of the means for obtaining the image of the VLC source.

26. The apparatus of claim 21, further comprising:
means for obtaining information regarding a relative movement of the apparatus; and
means for selecting a second operational mode from the plurality of operational modes based on the relative movement of the apparatus and at least one of the first position or the first operational mode.

27. A non-transitory computer-readable storage medium comprising machine-readable instructions stored thereon, the instructions, when executed by one or more processing units, causing the one or more processing units to:
obtain a first image frame including an image of a VLC source using an image sensor, the image sensor comprising a pixel array and operable in any of a plurality of operational modes, wherein, in each operational mode of the plurality of operational modes, the image sensor is operable to activate only pixels in a different respective region of interest (ROI) of the pixel array to capture light signals, each ROI including a center region of the pixel array;
determine a first position of the image of the VLC source on the pixel array;
select a first operational mode from the plurality of operational modes based on the determined first position of the image of the VLC source on the pixel array and the ROIs associated with the plurality of operational modes, the first operational mode having the smallest ROI among ROIs of the plurality of operational modes that includes at least a portion of the image of the VLC source on the pixel array in the first image frame; and
configure the image sensor to operate in the first operational mode.

28. The non-transitory computer-readable storage medium of claim 27, wherein the portion of the image of the VLC source on the pixel array includes at least 50% of the image of the VLC source on the pixel array.

29. The non-transitory computer-readable storage medium of claim 27, wherein:
the instructions causing the one or more processing units to determine the first position of the image of the VLC source on the pixel array comprise instructions for determining a minimum coordinate and a maximum coordinate of the image of the VLC source on the pixel array in each dimension of two dimensions of the pixel array; and
the instructions causing the one or more processing units to select the first operational mode comprise instructions for comparing the determined minimum coordinate and maximum coordinate of the image of the VLC source on the pixel array in each dimension of the two dimensions of the pixel array with the ROI associated with each operational mode of the plurality of operational modes in descending order of a size of the ROI associated with each mode, until one or more of the determined minimum and maximum coordinates of the image of the VLC source on the pixel array in the two dimensions of the pixel array are outside of the ROI associated with an operational mode of the plurality of operational modes.

30. The non-transitory computer-readable storage medium of claim 27, wherein the instructions, when executed by the one or more processing units, further cause the one or more processing units to:
obtain information regarding a relative movement of the image sensor; and
select a second operational mode from the plurality of operational modes based on the relative movement of the image sensor and at least one of the first position or the first operational mode.

* * * * *